(12) United States Patent
Petit-Huguenin et al.

(10) Patent No.: US 10,547,749 B1
(45) Date of Patent: *Jan. 28, 2020

(54) SYSTEMS, METHODS, DEVICES AND ARRANGEMENTS FOR COST-EFFECTIVE ROUTING

(71) Applicant: 8x8, Inc., San Jose, CA (US)

(72) Inventors: Marc Petit-Huguenin, San Jose, CA (US); Garth Judge, San Jose, CA (US)

(73) Assignee: 8x8, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,373

(22) Filed: Aug. 20, 2018

Related U.S. Application Data

(63) Continuation of application No. 15/708,654, filed on Sep. 19, 2017, now Pat. No. 10,057,428, which is a
(Continued)

(51) Int. Cl.
*H04M 7/00* (2006.01)
*H04M 15/00* (2006.01)
(Continued)

(52) U.S. Cl.
CPC .......... *H04M 7/0084* (2013.01); *H04L 12/66* (2013.01); *H04L 65/1006* (2013.01); *H04M 15/56* (2013.01); *H04L 43/00* (2013.01); *H04L 43/0823* (2013.01); *H04L 43/50* (2013.01); *H04L 2027/0075* (2013.01); *H04M 7/0069* (2013.01)

(58) Field of Classification Search
CPC ..... H04L 12/66; H04L 43/00; H04L 43/0823; H04L 43/50; H04L 65/1006; H04L 2027/0075; H04M 7/0069; H04M 7/0084; H04M 15/56

See application file for complete search history.

(56) References Cited

U.S. PATENT DOCUMENTS 6,788,649 B1    9/2004    Dugan et al.
6,961,315 B1    11/2005    Amster et al.
(Continued)

OTHER PUBLICATIONS

A. Khalifeh and A. El-Mousa, "Performance Evaluation of VoIP Using Shortest-Widest and Modified Widest-Shortest QoS Routing Algorithms," Proc. of the World Congress on Engineering, vol. 1, WCE 2007, Jul. 2-4, 2007, London, U.K.
(Continued)

*Primary Examiner* — Khaled M Kassim
*Assistant Examiner* — Kai Chang
(74) *Attorney, Agent, or Firm* — Crawford Maunu PLLC (57) ABSTRACT

A variety of methods, systems, devices and arrangements are implemented for assessing and/or controlling call routing for Internet-based (e.g., VoIP/VioIP) calls. According to one such method, endpoint devices are used to monitor and/or assess the call-quality. The assessment is sent to a centralized server arrangement and call-routing is controlled therefrom. Endpoint devices employ a decentralized testing mechanism to further monitor and assess call quality including the use of test connections. Aspects of call quality are analyzed and attributed to endpoint devices and/or local connections or networks to distinguish intermediate routing issues from local/endpoint issues.

20 Claims, 4 Drawing Sheets

Related U.S. Application Data continuation of application No. 14/947,015, filed on Nov. 20, 2015, now Pat. No. 9,769,321, which is a continuation of application No. 12/643,733, filed on Dec. 21, 2009, now Pat. No. 9,203,652.

(51) Int. Cl.
*H04L 29/06* (2006.01)
*H04L 12/66* (2006.01)
*H04L 12/26* (2006.01)
*H04L 27/00* (2006.01)

(56) References Cited

U.S. PATENT DOCUMENTS

| | | | |
|---|---|---|---|
| 7,197,010 B1* | 3/2007 | Berstein | H04L 41/5038 370/252 |
| 7,222,190 B2 | 5/2007 | Klinker et al. | |
| 7,339,934 B2 | 3/2008 | Mussman et al. | |
| 7,352,852 B1 | 4/2008 | Cocherl et al. | |
| 7,388,946 B1 | 6/2008 | Mussman et al. | |
| 7,773,587 B2 | 8/2010 | Corcoran | |
| 7,864,687 B2* | 1/2011 | Qian | H04L 41/0631 370/216 |
| 7,940,659 B2 | 5/2011 | Avila Gonzalez et al. | |
| 7,965,699 B1 | 6/2011 | Accardi et al. | |
| 8,046,474 B2 | 10/2011 | Kato et al. | |
| 8,063,928 B2 | 11/2011 | Krisbergh et al. | |
| 8,593,959 B2* | 11/2013 | Hepworth | H04L 29/06 370/229 |
| 9,203,652 B2 | 12/2015 | Petit-Huguenin et al. | |
| 9,769,321 B1 | 9/2017 | Petit-Huguenin et al. | |
| 2002/0105909 A1 | 8/2002 | Flanagan et al. | |
| 2002/0122429 A1 | 9/2002 | Griggs | |
| 2003/0161460 A1 | 8/2003 | Dammrose | |
| 2004/0125803 A1 | 7/2004 | Sangroniz et al. | |
| 2004/0208133 A1 | 10/2004 | Jay et al. | |
| 2004/0264386 A1 | 12/2004 | Ha | |
| 2005/0025123 A1 | 2/2005 | Mitsumori et al. | |
| 2005/0201364 A1 | 9/2005 | Dalton et al. | |
| 2005/0244015 A1 | 11/2005 | Sung | |
| 2005/0271029 A1 | 12/2005 | Iffland | |
| 2006/0031576 A1 | 2/2006 | Canright | |
| 2006/0268828 A1 | 11/2006 | Yarlagadda | |
| 2007/0183440 A1 | 8/2007 | Bennet et al. | |
| 2007/0248012 A1 | 10/2007 | Glinsman et al. | |
| 2008/0049738 A1 | 2/2008 | Joung et al. | |
| 2009/0147770 A1 | 6/2009 | Ku | |
| 2009/0268713 A1 | 10/2009 | Ottur et al. | |
| 2010/0142377 A1 | 6/2010 | Caciula et al. | |
| 2010/0172251 A1 | 7/2010 | Adam et al. | |
| 2010/0318665 A1 | 12/2010 | Demmer et al. | |
| 2011/0071820 A1* | 3/2011 | Kimura | H04L 29/06027 704/200 |
| 2011/0096762 A1 | 4/2011 | Basart | |
| 2011/0188494 A1 | 8/2011 | Johnson et al. | |
| 2014/0229614 A1 | 8/2014 | Aggarwal et al. | |

OTHER PUBLICATIONS

"Monitoring VoIP with Cisco Network Analysis Module White Paper Mar. 2009," pp. 1-13.
Ditech Networks, "Feature Overview," "Experience Intelligence™ for VoIP Networks," www.ditechnetworks.com.
TelArix, "iXRoute®—Optimized Routing," www.telarix.com.
Squire Technologies, Signalling Specialists to the Telecoms Industry, "Offering Least Cost Routing (LCR)," (2009).

\* cited by examiner

SYSTEMS, METHODS, DEVICES AND ARRANGEMENTS FOR COST-EFFECTIVE ROUTING

FIELD OF THE INVENTION

The present invention relates generally to cost effective routing and to systems, methods and devices for defining and adjusting data routing across multiple platforms.

BACKGROUND

Voice over Internet Protocol (VoIP) represents a variety of different transmission technologies that are used to provide voice communications over Internet Protocol (IP) networks, such as the Internet or similar packet-switched networks. In a general VoIP-based example, a microphone converts sound into analog electrical signals. The analog signals are then converted to a digital form. If desired, compression techniques (e.g., audio codecs that encode speech) are used to reduce bandwidth requirements. The resulting data is formatted into Internet protocol (IP) packets for transmission over the Internet. The process is reversed at the receiving end eventually producing sound from a speaker.

The connection and disconnection processes that are implemented between two VoIP endpoint devices are sometimes referred to as set-up and tear-down, respectively. This set-up and tear-down of calls is implemented according to rules defined by various VoIP (and or video-based) session control protocols, such as, H.323, Session Initiation Protocol (SIP), Real-time Transport Protocol (RTP), and/or IP Multimedia Subsystem (IMS).

The growth of Voice-over-IP (VoIP) devices, services and products presents a number of issues. Call routing is an important consideration in terms of costs for VoIP capable devices. Other issues include call quality factors such as packet loss, packet delay, and packet jitter.

Another expanding area relates to Video-over-IP (VioIP) devices, services and products. Although the data requirements are at least partially different relative to VoIP, similar issues with quality and user experience arise with video transmissions. For instance, packet loss can cause intermittent freezing of a video stream as well as artifacts. Such aspects can be considerably frustrating to a viewer and even render the video stream unintelligible.

SUMMARY

Aspects of the present invention are directed to routing selections that address challenges including those discussed above, and that are applicable to a variety of voice, video and data applications, devices, systems and methods. These and other aspects of the present invention are exemplified in a number of implementations and applications, some of which are shown in the figures and characterized in the claims section that follows.

According to one embodiment of the present invention, endpoint devices are used to monitor and/or assess the call-quality. The assessment is sent to a centralized server arrangement and call-routing is controlled therefrom. Endpoint devices employ a decentralized testing mechanism to further monitor and assess call quality including the use of test connections. Aspects of call quality are analyzed and attributed to endpoint devices and/or local connections or networks to distinguish intermediate routing issues from local/endpoint issues.

Consistent with one embodiment of the present invention, a system provides call routing. The system includes a plurality of endpoint devices each having an Internet Protocol (IP) interface, an audio output for producing audible sounds, an audio input for converting audible sounds to electrical signals, and a circuit including at least one processor and programmed software instructions. When the programmed software instructions are executed by the at least one processor, the processor performs the steps of measuring a plurality of call quality factors for a VoIP call implemented using the IP interface, and publishing, using the IP interface, data representing the plurality of call quality factors. The system also includes at least one server that has a database containing call-quality metrics and call-cost metrics for various call-routing options. The at least one server is configured and arranged for: receiving the published data representing the plurality of call quality factors, assigning, to the received data, weight factors representing different portions of a call route for the VoIP call, respectively, and selecting a call route for a subsequent VoIP call using an algorithm based upon the assigned weight factors and the call-cost metrics.

According to another embodiment of the present invention, an endpoint device (e.g., Voice over Internet Protocol (VoIP) endpoint device such as a mobile phone), includes an Internet Protocol (IP) interface circuit; an audio output for producing audible sounds; an audio input for converting audible sounds to electrical signals; and a circuit that includes at least one processor and programmed software instructions. When the instructions are executed by the at least one processor, steps are performed that include measuring a plurality of call quality factors for a VoIP call implemented using the IP interface, assigning, to the measured plurality of call quality factors, weight factors representing different portions of a call route for the VoIP call, and publishing, using the IP interface, results of the assessment of the plurality of call quality factors.

The above summary is not intended to describe each illustrated embodiment or every implementation of the present invention.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is directed to routing decisions including routing packet-based communications over a network, such as the Internet, and related approaches, their uses and systems for the same. As discussed in more detail herein, many aspects of the present invention are particularly well-suited for Voice over Internet Protocol (VoIP) applications; however, aspects of the present invention are also found to be useful for Video over Internet Protocol (VioIP) communications (with or without accompanying audio). While the present invention is not necessarily limited to such applications, various aspects of the invention may be appreciated through a discussion of various examples using this context.

Embodiments of the present invention relate to systems and components of systems that work as part of a robust voice call-routing solution. Aspects of the invention are implemented at various points in a call system that provides VoIP/VioIP call services. Endpoint devices, which provide call functions directly to a human user, communicate with one another using VoIP/VioIP servers that provide call-lookup, proxy functionality, NAT traversal and other functionality. Particular implementations also relate to routing of video communications between endpoint devices. While the transmitted data and specific data protocols used to format and send the data may differ, video and audio calls sometimes use many of the same underlying protocols for establishing and maintaining data connections (e.g., similar setup and teardown procedures). Aspects of the present invention relate to call-routing decisions made by a centralized server that services multiple endpoint devices.

Various embodiments relate to providing highly-scalable solutions, which leverage off of the increasing complexity and quantity of endpoint devices with VoIP/VioIP capabilities. In certain embodiments, the endpoint devices can be configured to facilitate data collection and to offload some of the processing from the centralized server. Other aspects relate to decentralized call-routing decisions made by the endpoint devices. The various components can be implemented alone or in combination as should be apparent from the many possible combinations that are discussed herein. Such discussions, however, are not limiting and variations thereof are possible.

As discussed herein, various embodiments of the present invention relate to the use of call-quality metrics and call-cost metrics in selection of a routing path. Particular implementations are relatively robust and flexible allowing for use of many different underlying algorithms and methods. For instance, U.S. Pat. No. 7,352,852, to Cocherl, et al. and issued Apr. 1, 2008; and U.S. Pat. No. 7,339,934 to Mussman et al. and issued Mar. 4, 2008, each describe example least-cost routing algorithms and uses thereof. U.S. Pat. No. 7,222,190, to Klinker, et al. and issued May 22, 2007, describes various performance metrics for IP-based transmission including an Exponentially Weighted Moving Average ("EWMA") method that establishes a moving threshold based on historic sampling that places an exponential weighting on the most recent samples. Each of these documents is fully incorporated herein by reference. These and other metrics can be used in connection with various embodiments of the present invention. For instance, aspects of the present invention allow for various factors, otherwise used in determining these call-quality metrics, to be attributed to endpoint devices and/or their immediate connection points and networks. Such factors can then be removed or discounted (e.g., by weighting) from consideration by the selected algorithm(s). In this manner, the results more accurately represent intermediate call route issues as opposed to local-route/endpoint issues.

According to one embodiment of the present invention, VoIP (or VioIP) capable endpoint devices (e.g., hand held devices, home computers or VoIP telephones) establish a VoIP/VioIP connection to another device over a particular call route. A call quality metric is determined for the call and associated with the particular call route. For future calls, call-routing decisions are made using an algorithm that can be configured to consider a variety of factors. A few factors include, but are not necessarily limited to, the call quality metric, financial costs associated with the routing, the type of service plan associated with the endpoint devices, the time of day and the type of endpoint device.

Call quality metrics can be designed as a function of a number of parameters. Example, non-limiting, parameters include jitter, packet loss, echoing and latency. Latency can be caused by delay factors, such as jitter buffer delay, propagation delay, transport delay and packetization/coding delays. Jitter buffer delay is caused by storage of received data in a buffer useful for compensating for varying arrival times of data. Propagation delay represents the time necessary for a data signal to physically traverse the network between two endpoint devices. Transport delay represents the delay necessary to traverse the various network devices within a data path. Packetization/coding delays are caused by data formatting and can include time necessary for conversions between analog and digital, compression and formatting of data into packets.

According to one embodiment of the present invention, the endpoint devices monitor call parameters during a call. Once the call is completed, the endpoint devices send the monitored call parameters to a remote server. In a particular implementation, the end point devices can send a Session Initiation Protocol (SIP) publish message that includes, within the body of the message, a call quality metric and/or the monitored parameters. The remote server then uses this data to determine preferred call routing for endpoint devices making subsequent calls.

In a particular implementation, the poor call quality metric results are attributed to specific portions or aspects of the call route. For instance, poor connections between an endpoint device and a local router, LAN or modem are a common cause of poor quality metric results. Thus, a quality metric for a particular endpoint device can be a poor indicator of the quality of a particular route for another endpoint device, particularly where the other endpoint device uses a different local connection point. Moreover, if the individual connection point is a significant cause of poor call quality, modifying call routing that occurs after the initial connection point may not solve the problem with the call quality. Accordingly, aspects of the present invention distinguish between different portions of the call route and attribute quality ratings to the respective portions. Intelligent call-routing decisions are then made using this additional data.

Certain symptoms of poor call quality are more likely to be caused by an individual connection point issue. For instance, bandwidth-related problems tend to be caused by individual connection point. Poor connections, connections to a bandwidth-limited service plan and/or heavily loaded connection points can limit effective bandwidth. Poor connections (wired or wireless) cause data to be corrupted or lost and thereby result in dropped or lost packets. Connection points vary in available bandwidth, which can reduce the call quality. Heavily loaded connection points can be caused by applications running on the endpoint device (e.g., file-sharing programs or malware/spyware) and other devices using the same connection point. Heavily loaded connection points cause a reduction in the available bandwidth. In another example, unwanted echoes are often caused by feedback or other problems within the endpoint device (e.g., poor lighting for video, feedback from speaker to microphone, electromagnetic crosstalk or poor speaker/microphone termination), as opposed to call routing, and can be attributed accordingly. Repeatedly poor latency can often be associated with problems in the call route and attributed in this fashion.

It should be noted that general tendencies of a particular symptom are not determinative and that many, if not most, symptoms can have several different causes. Accordingly, a particular implementation uses the symptoms to determine a weight factor for respective portions. This weight factor is then used as a correlation between a call quality metric and a respective portion. Strongly correlated portions suggest that the portions are a likely cause of a poor quality metric. This determination can be carried out by the endpoint devices or by one or more centralized servers. For instance, the endpoint devices could attribute a poor quality metric as 10% endpoint device, 70% local connection and 20% remote routing. This information could be locally stored and/or transmitted to a remote server.

The number of VoIP/VioIP capable devices is rapidly increasing due in part to increased usage of mobile/handheld devices with Internet capabilities. The mobility of the devices can complicate the ability to monitor and assess the likely source of poor call quality. For instance, mobile devices may connect to multiple different connection points within a single day. Each connection point can exhibit a different connection quality and use a different call route. The routing beyond the connection points can range from virtually identical or completely different, e.g., depending upon the relative location of the connection points. Moreover, the true connection point can be hidden and difficult to ascertain when, for example, the mobile device connection point is to a private network that uses NAT, firewalls and the like. As such, identification of the endpoint device does not necessarily correlate to a particular, or static, connection point.

One aspect of the present invention relates to an application that can be implemented on such mobile devices. Recognizing that the mobile device has visibility of the initial connection point and private network associated therewith, the mobile device tracks used connection points and an indication of the call quality metrics for the connection points. When establishing a new call, the application can make an initial routing decision based upon the stored call quality metric for the current connection point.

As an example, a mobile endpoint device may connect to a first wireless network access point and make a VoIP/VioIP call using this connection. The call quality metric of this call is recorded as being poor, and particularly, having quality factors that suggest that the connection point is a limiting factor. If the mobile device has other connection capabilities, such as cellular, PSTN, wired IP connections, or other available wireless networks, the mobile device can opt to use those connections. Another routing option is the selection of a particular VoIP/VioIP connection server or proxy. VoIP/VioIP servers may have preferences in terms of monetary costs (whether user or provided costs) to competing voice quality preferences (e.g., due to server performance or network location). Thus, if the voice quality metric for a particular connection is poor, the mobile device can select a server with a better quality metric over another server. Thus, the connection may exhibit a higher monetary cost but also have a higher quality metric.

Routing selections by the mobile device can be performed by applying a user profile that contains data regarding the respective costs of the different connection options. The application accesses this user profile in combination with the recorded quality metrics to determine the desired connection and/or call route. In a particular implementation, the user profile is controlled by the (VoIP/VioIP) service provider. The service provider is then able to perform offline analysis of the VoIP/VioIP service and adjust the user profiles accordingly. This allows for the service provider to control various aspects (e.g., server loads, overall voice quality or call-related costs) in combination with a distributed routing decisions system that uses the endpoint devices to implement call-routing decisions.

Another aspect of the present invention relates to an endpoint application (EA) that is designed to provide an interface for user-developed applications. User-developed applications are becoming increasingly useful. These applications can greatly increase the value of a particular service or device often in ways not originally contemplated. They also provide users with endless customizations and personalization of the product or service. The EA provides an interface to affect the routing decisions. This allows such user-developed applications to provide some level of input and control over the routing decisions. The service provider determines the precise amount of control given to the user application by the EA. Allowing the user-developed application to have less control means that the service provider is able to exhibit more control over how the calls are routed. Allowing the user-developed application to have more control increases the potential for different types of user applications.

User-developed applications can be organically created by individuals or generated by companies for download. For example, a number of VoIP applications are currently available for providing VoIP connections with cellular phones (e.g., Fring, Talkster, Nimbuzz or Barablu). Such applications can interface with the EA to provide customizable routing decisions.

One component of the EA is designed to provide an application interface that receives an input representing the importance of quality vs. cost to the user. The input could be a value on a scale (e.g., scale of 1 to 10 with 10 representing the highest quality importance, with little regard for cost). The EA receives the input and uses it as part of the routing decision. The EA can directly perform the routing decision based upon the input and/or forward the input to a remote server for routing decisions. The user-designed application could provide a value for the input based upon nearly any criteria. For example, the user application may designate calls to certain numbers (e.g., personal calls) as having lower priority of quality while others (e.g., business calls) have a higher priority of quality. Video could be given a lower priority than audio and vice versa. Another EA might automatically detect a physical location or a logical location (e.g., GPS-determined location or a connection-point-determined location) for the mobile device and adjust the input accordingly. The EA could also simply allow the user to directly set the input value through a graphical user interface (GUI).

Implementations of the EA receive, from the user application, inputs representing the importance of a number of different call-quality and call-cost criteria. For instance, the user application could indicate that jitter is highly important, while echoing is not as important. In another instance, the application could indicate that all factors are equally important.

The EA can also be designed to allow the user application to add one or more custom factors. Thus, the EA will continue to monitor jitter, packet loss, echoing and latency (and other factors) during calls; however, the user application can introduce additional factors stored as part of the call quality assessment. For instance, the user application could monitor audio-frequency components of the call or some other factor as yet undetermined. The input would then be added as a component of the call quality metric for the user's endpoint device and thereby be used as part of subsequent call routing decisions. One mode of the EA even allows the user application to fully control, set or define the algorithms used to determine call quality and/or the routing decisions.

The EA can set the level of control in response to a number of mechanisms. One such mechanism involves a tiered-service structure. In this manner, the EA provides additional control to users that have higher service plans.

Embodiments of the present invention also allow the endpoint devices to use various diagnostic procedures to help assess the likely cause of poor call quality. One such diagnostic procedure relates to endpoint-based problems with transmitting or receiving data packets. For example, insufficient processing power (e.g., due to design and/or other applications demanding processing resources) can result in degraded call quality. To help quantify such endpoint-related factors, the endpoint enters a diagnostic mode. In the diagnostic mode, the endpoint transmits a pseudo-data stream to itself. This can be accomplished using a loopback IP address (e.g., 127.0.0.1) as defined in the IP standards. Quality factors for the loopback transmission are measured accordingly. Problems incurred during this loopback transmission are largely limited to problems of the endpoint device. Thus, poor quality indications can be attributed to the endpoint device with high confidence. The quality indications from an actual call can then be adjusted to account for the endpoint device's internal quality factor. In this manner, the system can discount such endpoint device issues when assessing a particular call route.

While the circuit/processor measurable factors, such as jitter, packet loss, latency and echo, provide a good indication of call quality, they do not perfectly model the call quality perceived by a person using an endpoint device. Thus, the EA also uses input from users to assess and define the quality of a call route. In one implementation, the EA prompts a user to provide call-quality feedback (e.g., rate call from 1 to 10) and use this information as part of the call-quality assessment.

User participation, however, is sometimes difficult to obtain, and thus, the EA can be configured to obtain user input in other manners. A particular implementation takes advantage of mobile devices that have motion sensing components, such as gyroscopes. When a user experiences bad call quality, the user is encouraged to shake the device. The shaking indicates to the EA that the user may be experiencing poor call quality. If the shaking coincides with other indications of poor call quality, then the EA can be relatively certain that the user is providing negative feedback regarding the call quality. User participation is encouraged because it is believed that shaking the device is a natural response that requires less time and consideration than asking the user to input a numerical value. Moreover, the EA can respond to the shaking by attempting to establish a connection via a different call route. Once established, the EA can seamlessly switch the conversation to the second call route. If the user is aware of this general feature, it provides additional incentive to provide feedback by shaking as the shaking may result in an improved connection due to this re-routing of the call.

Although not limited thereto, a few example call quality metrics include Mean Opinion Score (MOS), ITU P.861 (Perceptual Speech Quality Measure or PSQM), ITU P.826 (Perceptual Evaluation of Speech Quality or PESQ), ITU P.563, or ITU P.800 (Perceptual Analysis/Measurement System or PAMS) as well as variations and combinations thereof. Example video quality metrics include, but are not limited to, ITU-T Rec. J.246 (RR) and J.247 (FR).

Collection and analysis of data obtained during active calls is a powerful tool in assessing call quality as a function of call routing; however, aspects of the present invention allow for active testing of call-routing parameters. In a particular implementation, when poor call quality is detected, additional information regarding the call route in question can be actively obtained.

One mechanism for actively obtaining call route information involves use of additional endpoint devices to dynamically test the state of the network by testing various call routes. These additional endpoint devices transmit test data along one or more data routes. The test data can be used to define the voice quality provided by a particular data route. This testing can be implemented in response to poor call quality being detected by a particular endpoint device. In certain implementations, this allows for the test to be conducted while a call associated with the particular endpoint device is still ongoing. The various quality metrics can then be directly correlated in time, which can be useful in determining a likely cause of poor call quality. For instance, a VoIP/VioIP server can identify an endpoint device that has a similar or identical location to the current endpoint device. The VoIP/VioIP server can then request a test connection with the identified-test endpoint device. The test endpoint device transmits data packets to and receives data packets from the VoIP/VioIP server. The call quality metric of this connection can be compared to that of the endpoint device that originally detected the poor call quality. If the call quality of the test connection is significantly better than that of the original connection, then portions of the route shared between the connections are less likely to be the main cause of the poor quality.

In another implementation, the original endpoint device can be configured to perform a test connection after completion of the poor-quality connection. The endpoint device requests a connection to a VoIP/VioIP server designed to receive and establish test connections. In a particular embodiment, the test connection can be implemented as a background application that the user of the endpoint device need not be aware of. The endpoint device can establish and complete the test connection over a relatively short time duration, which can be particularly useful for limiting processor or network loading that would be associated with the test connection.

In another implementation, the endpoint device can implement a test connection by contacting and connecting to other endpoint devices. This can be particularly useful for facilitating a scalable solution that uses distributed testing. For instance, using a centralized test server requires increasing network bandwidth and processing bandwidth as the number of requesting endpoint devices increases. A distributed architecture, however, naturally scales because test-requesting endpoint devices are also test-receiving endpoint devices.

Connections between two test endpoint devices can be facilitated using a VoIP/VioIP server. A requesting endpoint device contacts the VoIP/VioIP server to indicate a desire to establish a test connection. The VoIP/VioIP server identifies a suitable endpoint device and provides connection information back to the requesting endpoint device. Alternatively, endpoint devices can obtain one or more test endpoint devices from a streamed list of test endpoint devices. A VoIP/VioIP server can transmit a multicast stream according to the IPv6 multicast standard. The multicast stream includes a list of endpoint devices. A requesting endpoint device can subscribe to the multicast stream to obtain one or more endpoint devices with which to establish a test connection. In a particular implementation, multiple multicast streams can be provided and subscribed to according to desired parameters. The multicast streams can represent different locations of endpoint devices, different types of endpoint devices, different capabilities of endpoint devices or any other desirable distinction. Testing endpoint devices provide such test results to a VoIP/VioIP server (e.g., using SIP publish message) and can also keep the results for local routing determinations.

Figure 1:
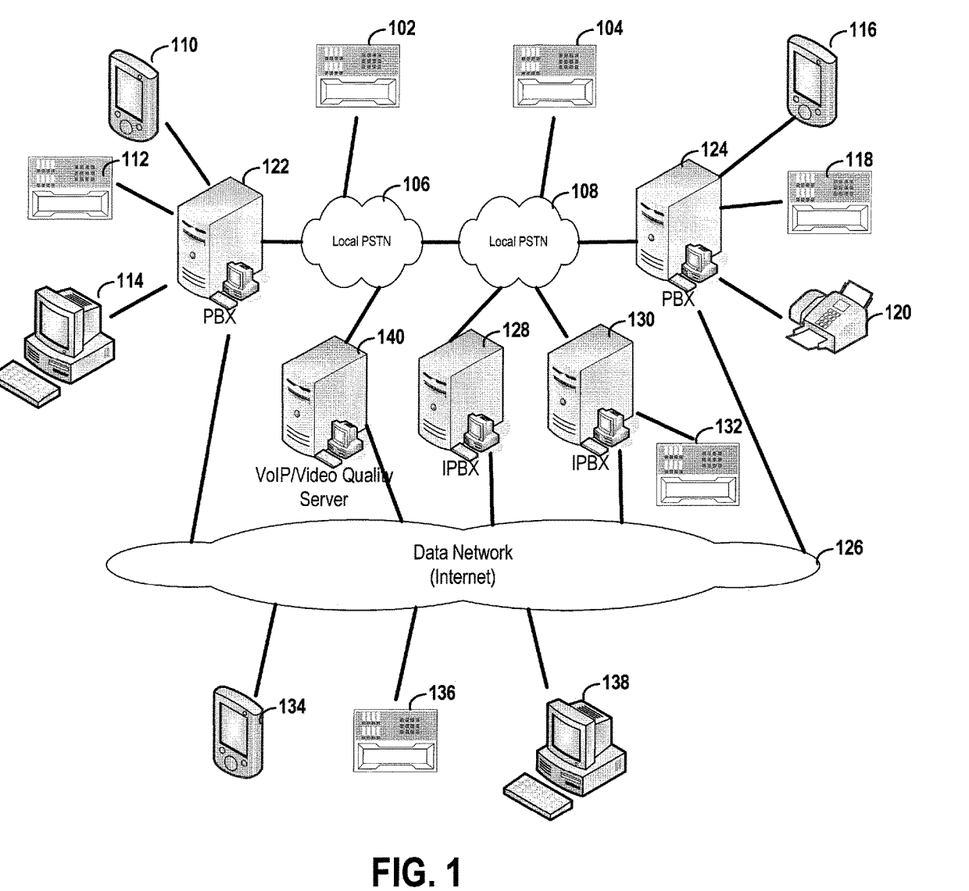
FIG. 1 depicts a system for communicating between endpoint devices using VoIP/VioIP, consistent with an embodiment of the present invention.

Turning now to the figures, FIG. 1 depicts a system for communicating between endpoint devices using VoIP/VioIP, consistent with an embodiment of the present invention. Telephone devices 102, 104 connect directly with local Public-Switched-Telephone Networks (PSTNs) 106, 108. A standard telephone call can be completed between such devices using the traditional telephone service. Private Branch Exchange (PBX)-based devices 110, 112, 114, 116, 118, 120, connect directly with PBX 122 or 124. The PBX-based devices can include any number of different devices including, but not limited to, analog telephones, digital telephones, Internet-enabled handheld devices, workstation computers, faxes and BRI-enabled devices. PBXes 122, 124 can provide direct connection to the standard telephone network via local PSTNs 106, 108 and/or connections to data network/Internet 126. They can also provide various calling features, such as call forwarding, extension dialing, programmable caller-ID, auto attendant and interactive voice response, to name a few. Internet-PBXes (IP-BXes) 128, 130 provide PBX functions to devices while establishing VoIP/VioIP connections. An IPBX can provide services for local devices 132 and/or to remote endpoint devices 134, 136, 138. For example, the IPBX can be configured to receive calls destined for or arriving from remote devices that are associated with the IPBX.

The VoIP/VioIP quality server 140 receives, stores and analyzes call quality data received from various devices. For example, remote endpoint devices 134, 136, 138 establish connections between one another or to other endpoint devices (e.g., devices 102, 104, 110, 112, 114, 116, 118, 120 or 132). The endpoint devices monitor the quality parameters of a particular call. This data is then sent to the VoIP/VioIP quality server 140 for analysis using, for example, a SIP publish message. Future routing can be controlled using results of the analysis by VoIP/VioIP quality server 140. As an example, a VoIP/VioIP call routing server (not shown) can use data generated by the VoIP/VioIP quality server 140 to control call-routing for various ones of the endpoint devices.

Consistent with various embodiments, the system distinguishes between call quality issues associated with the endpoint devices and the initial connection point from call route-related issues. The VoIP/VioIP server can assign weight values to correspond to a determined percentage of call-related issues associated with each portion of the call (e.g., endpoint device issues, connection-point issues or network node issues).

In particular implementations, the endpoint devices can establish test connections between one another. The endpoint devices can send pre-defined test data to help isolate quality problems associated with the endpoint device from call route problems. For instance, quality effects due to poor speakers, microphones and circuitry for conversions of audio between analog and digital domains would be lessened or removed entirely during such test transmissions.

In one embodiment of the present invention, the endpoint devices receive a list of devices available for test connections by subscribing to a multicast session. The device can receive a partial list, a complete list or a single device. The selection of an appropriate device can be random or attributed to characteristics of the devices, which can also be provided as part of a multicast stream.

Figure 2:
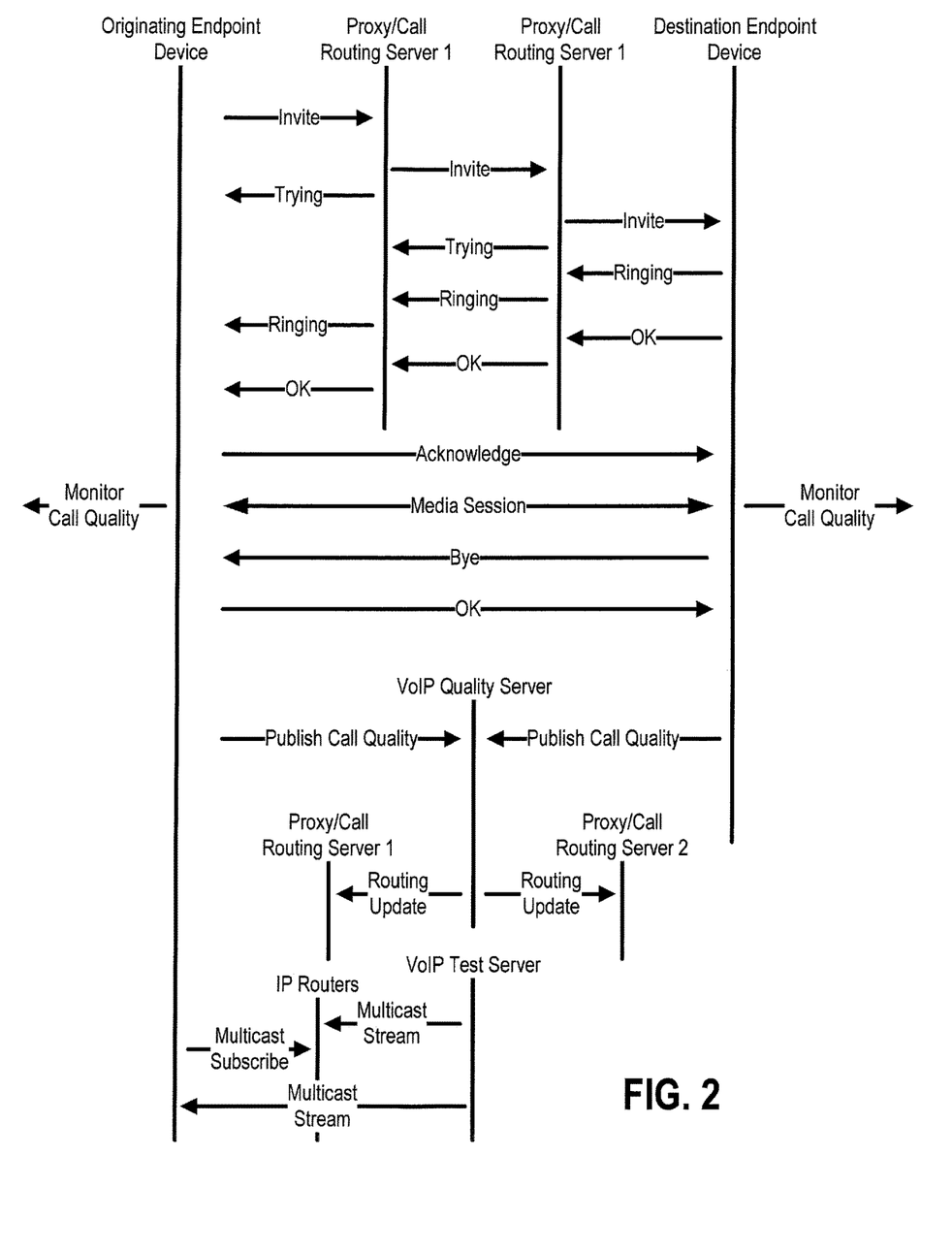
FIG. 2 depicts a request/response transaction model, consistent with an embodiment of the present invention.

FIG. 2 depicts a request/response transaction model, consistent with an embodiment of the present invention. The transaction model is consistent with SIP protocols, but the specific connection steps and protocols between the endpoint devices need not be so limited. The invention is instead sufficiently robust to be compatible with various other existing and future protocols.

An originating endpoint device desires to establish a connection with a destination endpoint device. In a specific implementation, the connection is started when a user dials a telephone number that indicates a desired endpoint device or user to contact. The originating endpoint device sends an invite command that identifies the destination endpoint device (e.g., using a telephone number or IP-address). Optionally, proxy/routing server 1 and 2 serve to control the connection process. Proxy servers receive connection requests and forward them on behalf of the requestor. Proxy server 1 receives the invite command and sends a trying response back to the originating endpoint device. Proxy server 1 determines the location of the destination endpoint device. In certain instances, the destination endpoint device is also behind a proxy server, in this case proxy server 2. Proxy server 1 forwards the invite request to proxy server 2, which responds with a trying response. Proxy server 2 identifies the IP address of the destination endpoint device and forwards the invite request thereto. The destination endpoint device receives the invite request and alerts a user of the endpoint device (e.g., the endpoint device/phone rings). The destination endpoint device sends a ringing response, which is routed back through the two proxies. Should the destination endpoint device user answer the call, the destination endpoint device transmits an O.K. response that indicates the call is being answered. Upon receipt of the O.K. response, the originating endpoint device sends an acknowledge response which allows a bidirectional media stream to be established between endpoint devices. Upon completion of the call, a sequence of bye and O.K. responses are sent.

During the call, and particularly during the bidirectional media stream phase, one or more of the endpoint devices can monitor call quality parameters. Upon completion of the call (or even during the call), the monitored parameters can be published to a VoIP/VioIP call quality server using, for example, SIP-based publish messages. The VoIP/VioIP call quality server can then process the received data and, if desired/necessary, send call-routing updates to the proxy servers.

In certain embodiments, endpoint devices can establish test connections to help quantify and assess call-quality issues. To establish such connections, the endpoint devices need to determine what device to connect with. In a first implementation, a VoIP/VioIP test server transmits a list of test-connection endpoint devices using a multicast stream. This multicast stream can be consistent with IPv6 specification which allows for intelligent routing by IP routers. For instance, IP routers forward multicast streams only if a downstream device has subscribed to the multicast stream.

In another embodiment, the endpoint devices can establish test connections by sending a connection request to one or more predetermined test connection addresses. A VoIP/VioIP server is associated with the test connection address and can forward the connection request on to available endpoint devices. For instance, an originating endpoint device can send a test connection request to an IP-address/port combination that routes the call to a VoIP/VioIP server while also identifying the request as a test-connection. The VoIP/VioIP server selects from a variety of other endpoint devices and forwards the test-connection request to this device, thereby acting as a proxy server. The endpoint devices then proceed to send test data and to monitor the call quality thereof.

Figure 3:
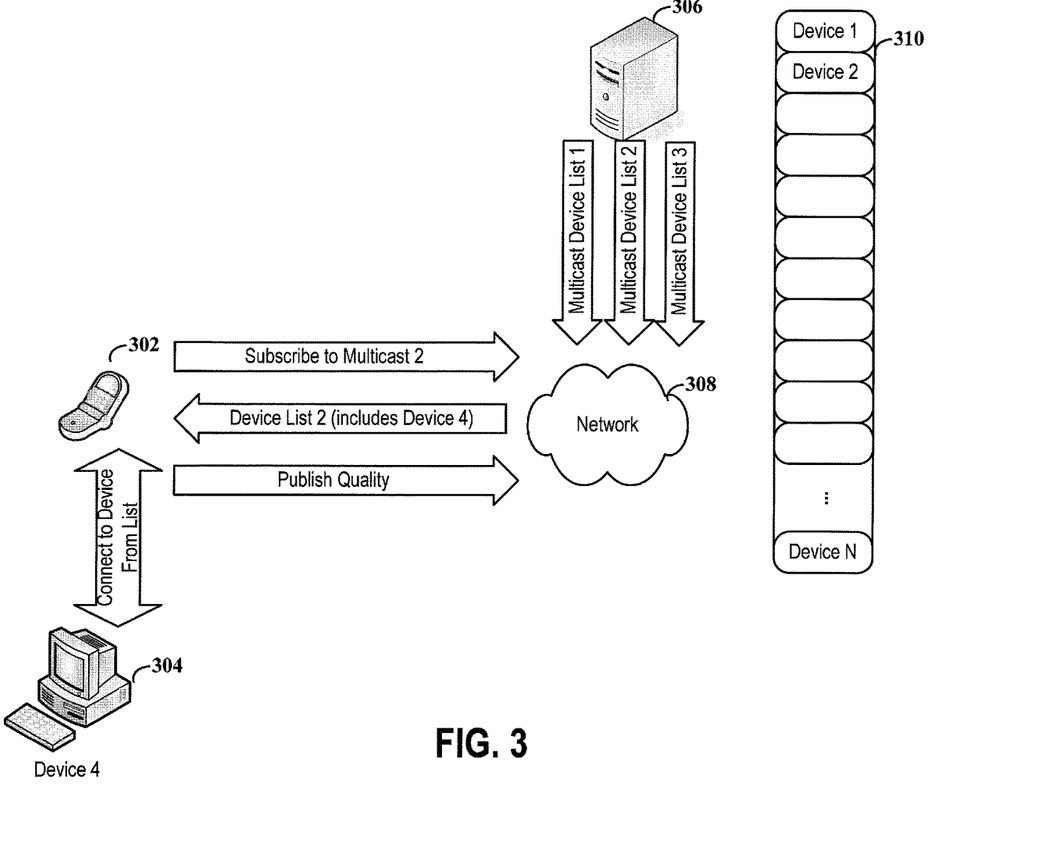
FIG. 3 depicts a flow diagram for establishing test connections between endpoint devices, consistent with embodiments of the present invention.

FIG. 3 depicts a flow diagram for establishing test connections between endpoint devices, consistent with embodiments of the present invention. Endpoint devices 302 and 304 have the capability of establishing VoIP/VioIP communications over network 308. As discussed herein, call routing decisions are made based upon call quality metrics measured during calls. Moreover, test connections can be established between two endpoint devices.

Such test connections can be particularly useful as they allow for a number of variables to be isolated or removed from contributing factors of poor call quality. For instance, the endpoint devices can transmit predetermined or (randomly) generated test-data during a test connection. The call quality metrics on such data are independent of audio issues with speakers, microphones and audio processing. This allows the test to isolate problems associated with sound generation and/or capture from transmission problems. In another instance, the use of data that can be easily quantified helps isolate perceived call-quality problems that are not due either to the call route or to the endpoint devices. For instance, background noise, poor placement of the microphone (e.g., relative to a user's mouth) or user hearing problems can each result in perceived call-quality problems. Sending data that is unaffected by any of these issues allows for increased accuracy in the testing of particular call-routing paths.

To establish a test connection, an originating endpoint device must first select/determine/discover another endpoint device with which to connect. One method allows an endpoint device to request information about such an endpoint device from a server 306. The server can return connection information (e.g., telephone number or IP address) about one or more endpoint devices 310 with which the originating endpoint device can connect. The originating endpoint device can then contact and establish a connection with one of the provided endpoint devices. The originating endpoint device sends a connection request that indicates that a test connection is desired. For instance, SIP allows for a request to include a definition of the nature of a request as part of the protocol. The destination endpoint device can therefore implement the test connection in the background and, if desired, without user interaction. Thus, the destination endpoint device does not ring or otherwise indicate a call is inbound. In some instances, the destination endpoint device can reject a test call. This may be the case where, for example, the destination endpoint device is operating on battery power that is low or where the destination endpoint device is engaged in operations that would be adversely affected by a test connection, e.g., operations requiring significant processing power or network bandwidth.

While the above mechanism for obtaining a list of available endpoint devices works well in many situations, as the number of requesting devices grows, so too does the load on the server that responds to the requests. One aspect of the present invention provides a highly-scalable solution involving the use of multicast protocols, such as those built into the IPv6 standard. In particular, a multicast stream can be established by a server. Downstream routing, however, is controlled via the routing nodes of the network. The routing nodes forward the multicast stream only in the event that a device has subscribed to the multicast stream at some location beyond the routing node. In this manner, the originating server does not see a significant increase in bandwidth or server loading as the number of subscribing devices increases.

In a particular embodiment, the server 306 can provide a number of different multicast streams (e.g., multicast streams 1, 2 and 3 of FIG. 3), each including a different list of available endpoint devices for connection therewith. The originating endpoint device 302 subscribes to one or more of the multicast streams to receive the available endpoint devices. The example depicted in FIG. 3 shows endpoint device 302 subscribing to multicast stream 2 and receiving the corresponding data, which includes endpoint device 304. The endpoint device 302 then establishes a test connection with endpoint device 304 and then can (SIP) publish any call-quality metrics obtained from the test.

The different multicast streams can be defined using a variety of factors. One such factor includes different logical or physical/geographical locations of the endpoint devices. An originating endpoint device can thus select a location to specifically test routing thereto. As other, non-limiting examples, the different multicast streams can represent different types of endpoint devices (e.g., home computer, laptop or cellular telephones), different connection types (e.g., T1, modem or wireless) or different software versions.

In other embodiments, separate multicast streams can be provided for updates to the devices. These updates can include changes to the test data sent between devices, changes to the testing criteria used to assess call quality and/or various software updates. In a particular implementation, each device maintains a locally-stored list that contains version data for various updatable components. The devices can periodically subscribe to a multicast stream that contains a corresponding list of the most current version of updates available. The endpoint device can compare the locally-stored list with the multicast list. If the endpoint device determines that an update is available, the endpoint device can subscribe to a corresponding multicast stream.

The use of such multicast aspects can be particularly useful for addressing issues related to the (lack of) scalability for various VoIP/VoIP-related products and services.

Figure 4:
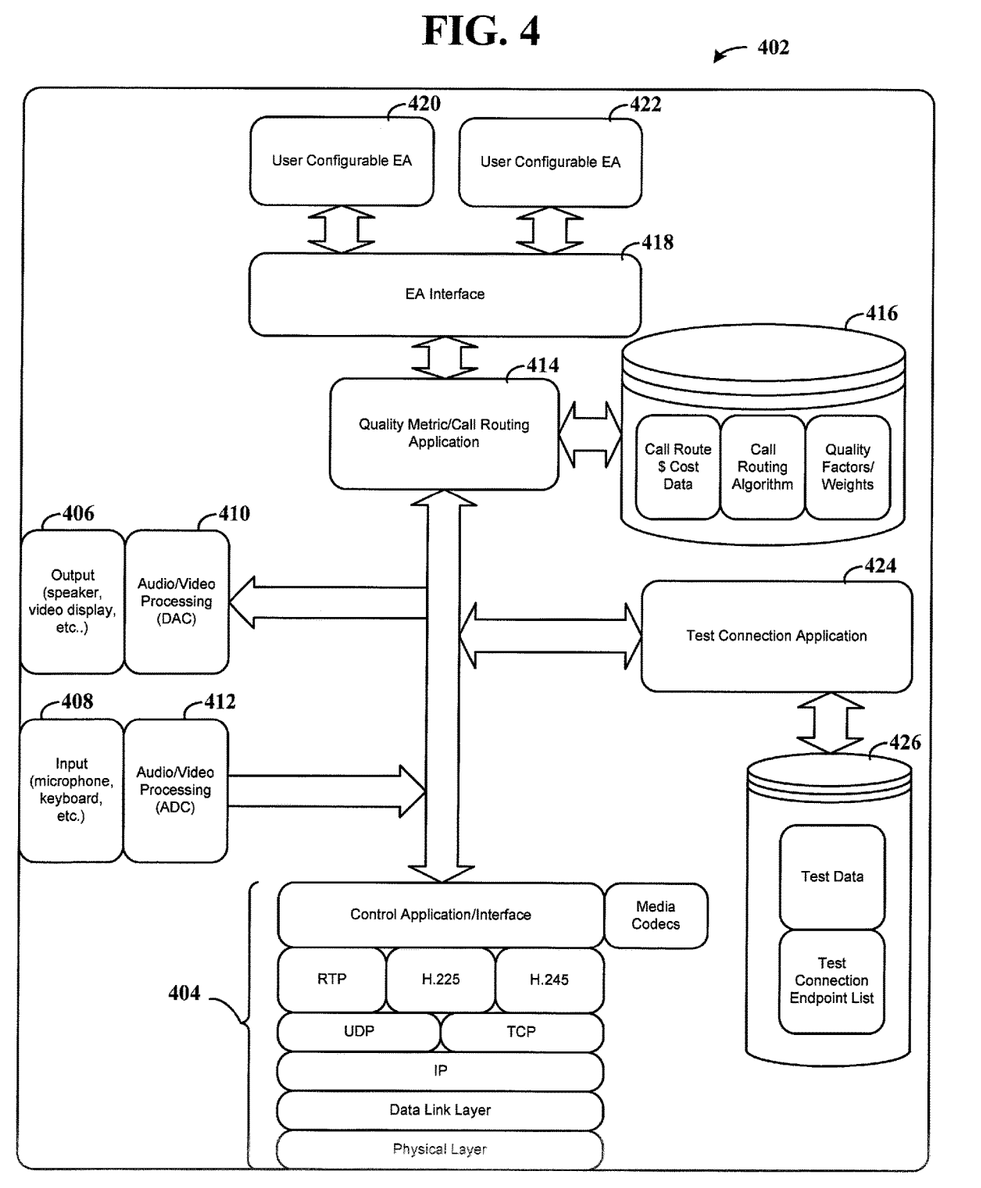
FIG. 4 depicts a functional diagram for an endpoint device, consistent with an embodiment of the present invention.

FIG. 4 depicts a functional diagram for an endpoint device, consistent with an embodiment of the present invention. Endpoint device 402 provides a number of functions including implementation of a VoIP/VioIP-related protocol stack 404. This stack 404 can conform to any number of suitable protocols. The example stack 404 is consistent with an H.323 approach, but the endpoint device need not be so limited.

A user of the endpoint device 402 communicates with a remote user through various input/output ports 406 and 408. For instance, a VoIP/VioIP capable phone would include some type of speaker arrangement for an output and a microphone for an input. Signals to and from the speaker/microphone can be conditioned and/or converted between digital and analog realms using audio/visual processing circuitry 410 and 412. This data can be received and transmitted to a control application for processing according to the protocol stack 404. A quality metric/call routing application 414 monitors the quality of a call. As discussed herein, the quality metric application 414 uses a set of call-quality factors and/or weights, which can be stored in a local memory or database 416. In certain embodiments, application 414 can also make call routing decisions based upon stored call-quality metrics, routing algorithms and/or monetary call-costs data.

Consistent with one embodiment of the present invention, an endpoint-application (EA) interface 418 provides a defined structure for users wishing to generate EAs 420 and 422 for interfacing with and controlling call routing and/or call quality metrics. The EAs allow users to develop applications for a variety of applications within the parameters established by the EA interface 418. This can include multiple EAs running on a single endpoint device.

Test-connection application 424 controls the establishment of test connections useful for characterizing call quality metrics and related issues. Test-connection application 424 can respond to an incoming (VoIP/VioIP) connection request that includes a test-connection indication within the connection request. This allows for the test-connection application 424 to establish connections without bothering a user of the endpoint device. The test-connection application 424 can also initiate a test connection by accessing a memory/database 426 storing a test-connection endpoint list. In one implementation, this list can be obtained from a server, which can optionally provide endpoint list(s) using multicast stream(s).

Once a test connection is established, test-connection application 424 transmits and receives data using the test connection. This data can be stored in memory/database 426. The data can be designed to simulate data transmitted during a typical (VoIP/VioIP) connection between endpoint devices and/or specifically constructed to test other aspects. For instance, the data can be designed to test bandwidth problems, processing-power issues and the like. In addition to test connections, test-connection application 424 can perform internal testing of various components of the endpoint device. This can include processor loading, memory availability, loopback tests of audio circuitry, loopback testing of protocol stacks and various other tests.

Test-connection application 424 can then use the test results to modify the parameters used to determine the call-quality metrics. For instance, a test may indicate that the endpoint device lacks processor power. Poor call-quality metrics of calls would thereafter be attributed to the endpoint device (rather than a call-routing issue) assuming the tested factors of the metric are consistent with a lack of processing power. The published call quality metric could include such an indication, which allows the receiving call-routing server to properly attribute poor-call quality metrics to the endpoint device.

The various aspects of the present invention can take a variety of forms and be implemented according to a number of different embodiments including, but not limited to, a storage medium storing with executable instructions, computer processors configured with executable instructions, programmable logic, hardware circuit logic and combinations thereof.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. For example, the methods, devices and systems discussed herein may be implemented in connection with voice-over Internet services, streaming media and call-processing. The invention may also be implemented using a variety of approaches such as those involving a number of different operating systems and software programs/packages. Such modifications and changes do not depart from the true spirit and scope of the present invention, including that set forth in the following claims.

What is claimed is:

1. A system comprising:
    a processor circuit;
    at least one data communications server including the processor circuit and configured to:
        retrieve call quality data representing a plurality of call quality factors for a plurality of data communications, each call quality factor representing a call quality indication for a corresponding data communications call to be routed by the server,
        identify a particular data communication from the plurality of data communications based upon the plurality of quality factors indicating poor quality for the particular data communication,
        select, in response to identifying the particular data communication, a capable endpoint device having communications circuitry,
        request a test connection to the selected endpoint device;
        based upon on the pluralities of call quality factors, associating different weight values to the respective call quality factors for the particular data communications, each weight value signifying a likelihood that the quality indicated by a quality factor is caused by a corresponding portion of a route for the particular data communications, and
        using a second route for routing a subsequent communications call based upon criteria that includes the plurality of different weight values.

2. The system of claim 1, wherein the at least one server is further configured to:
    select the capable endpoint device based upon a location for another capable device that is an endpoint for the particular data communications, the other device also including communications circuitry.

3. The system of claim 1, wherein the at least one server is further configured to:
    compare the plurality of quality factors for the test connection with the plurality of call quality factors indicating poor quality for the particular data communications,
    compare the call quality for the test connection to the call quality for the particular data communications, and
    determine, based upon at least comparing the call qualities, the weight values for the particular data communications.

4. The system of claim 1, wherein the at least one server is further configured to send and receive test data packets from the selected endpoint device using the test connection.

5. The system of claim 1, wherein the at least one server is further configured to:
request the test connection to the selected endpoint device while the particular call is ongoing.

6. The system of claim 2, wherein the at least one server includes a voice/video over IP server that is configured to:
receive SIP (session-initiation-protocol)-based publish messages from the capable endpoint devices, the SIP-based publish messages containing the plurality of call quality factors for the plurality of data communications; and
send, in response to the plurality of different weight values, updates to proxy servers that are configured to control a connection process for the plurality of data communications.

7. The system of claim 1, wherein the plurality of data communications includes data representing audible sounds.

8. An endpoint device comprising:
IP (Internet Protocol) interface circuit;
an audio output circuit for producing audible sounds;
an audio input circuit for converting audible sounds to electrical signals; and
a logic circuit including at least one processor and programmed software instructions that, when executed by the at least one processor:
measure a first set of call quality factors for an Internet-based call or communication implemented using the IP interface circuit,
request, from a server which is configured to perform call tests, a list of at least one endpoint device for establishing a test connection,
receive, from the server, the list of at least one endpoint device for establishing a test connection,
established, based upon the received list and using the IP interface circuit, a test connection with a particular endpoint device from the list, and
measure a second set of call quality factors for the test connection.

9. The endpoint device of claim 8, wherein the endpoint device is further configured to publish the first and second sets of call quality factors using session-initiation-protocol (SIP)-based publish messages.

10. The endpoint device of claim 8, wherein the endpoint device is further configured to request the list by subscribing to a multicast stream.

11. The endpoint device of claim 8, wherein the endpoint device is further configured to send test data during the test connection with a particular endpoint device from the list, wherein the test data does not include data received from the audio input circuit.

12. The endpoint device of claim 8, wherein the endpoint device is further configured to establish a loopback test connection and to measure a third set of call quality factors for the loopback test connection.

13. The endpoint device of claim 8, wherein the endpoint device is further configured to:
receive an incoming test connection request,
establish another test connection, and
measure a third set of call quality factors for the another test connection.

14. The endpoint device of claim 13, wherein the Voice over Internet Protocol (VoIP) IP endpoint device is further configured to establish another test connection without first ringing.

15. A method involving Internet-based call routing, the method comprising:
using at least one server, that includes a processor circuit, to:
retrieve call quality data representing a plurality of call quality factors for a plurality of Internet-based calls or data communications characterized by the calls or data communications being communicated via an IP (Internet Protocol), each call quality factor representing a call quality for a corresponding call route,
identify a particular call from the plurality of Internet-based calls based upon the plurality of call quality factors indicating poor call quality for the particular call,
select, in response to identifying the particular call, a IP-communication capable device characterized in that the IP-communication capable device includes circuitry for communications over the Internet,
request a test connection to the selected IP-communication capable device;
assign, based upon the comparing of the pluralities of call quality factors, a plurality of different weight values to each call quality factor for a particular call, each weight value signifying a likelihood that the quality indicated by a call quality factor is caused by a corresponding portion of a call route for the particular call, and
select a second call route for a subsequent VoIP call using an algorithm based upon the plurality of different weight values and the call quality factors.

16. The method of claim 15, further comprising using the at least one server to compare the call quality for the test connection to the call quality for the particular call.

17. The method of claim 16, further comprising using the at least one server to determine, based upon at least comparing the call qualities, the weight values for the particular call.

18. The method of claim 16, wherein the plurality of data communications includes data representing audible sounds.

19. The method of claim 15, further comprising using the at least one server to receive SIP (session-initiation-protocol)-based publish messages from capable endpoint devices used in the plurality of calls, the SIP-based publish messages containing the plurality of call quality factors for the plurality of calls.

20. The method of claim 19, further comprising using the at least one server to:
send, in response to the plurality of different weight values, updates to proxy servers that are configured to control a connection process for the plurality of calls.

* * * * *